(No Model.)

J. TRIPP.
TIRE TIGHTENER.

No. 513,159. Patented Jan. 23, 1894.

Witnesses:
S. A. Davenport
E. Behel

Inventor
John Tripp
By A. O. Behel
Atty.

UNITED STATES PATENT OFFICE.

JOHN TRIPP, OF GENOA, ILLINOIS.

TIRE-TIGHTENER.

SPECIFICATION forming part of Letters Patent No. 513,159, dated January 23, 1894.

Application filed October 14, 1893. Serial No. 488,187. (No model.)

*To all whom it may concern:*

Be it known that I, JOHN TRIPP, a citizen of the United States, residing at Genoa, in the county of McHenry and State of Illinois, have invented certain new and useful Improvements in Devices for Adjusting Fellies to Tires, of which the following is a specification.

The object of this invention is to construct a device for separating the end of a spoke from the felly in order that a washer may be placed around the tenon of the spoke between the shoulder and the felly which will hold the felly in contact with the tire.

Figure 1:
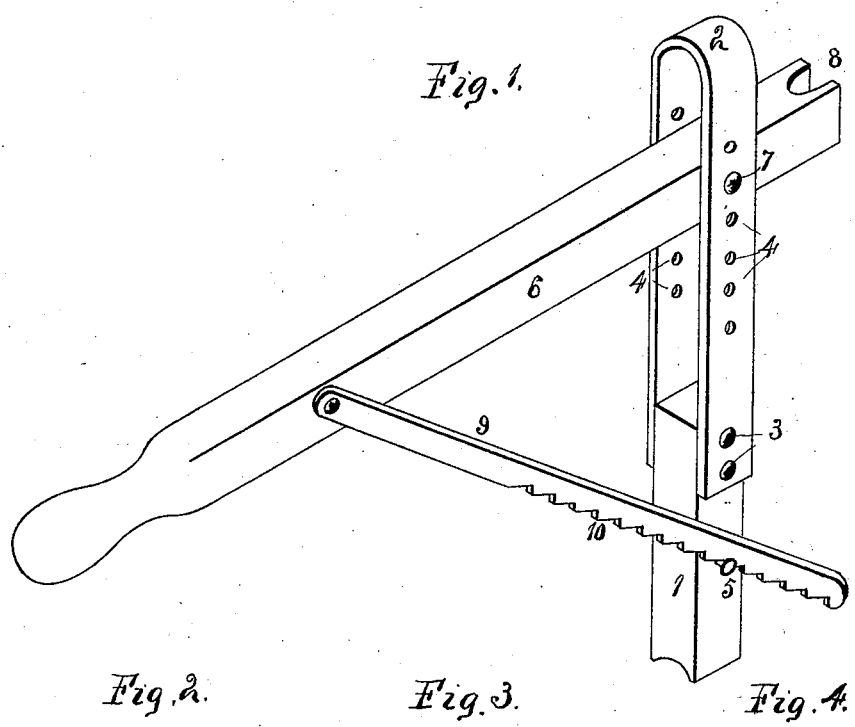
Figure 2:
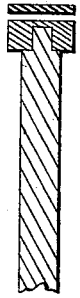
Figure 3:
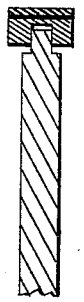
Figure 4:
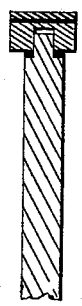

In the accompanying drawings—Figure 1, is an isometrical representation of my improved device. Fig. 2, is a section of a wheel felly, tire and spoke showing the condition of the parts before the application of my device. Fig. 3, is a similar view in which the felly has been forced against the tire. Fig. 4 shows a washer placed between the shoulder of the spoke and the under face of the felly holding it against the tire.

The standard 1, is of rectangular form having its lower end hollowed out; to its upper end is secured a metallic yoke 2, by bolts 3. This yoke is provided with perforations 4. From the side of the base extends a headed pin 5. A lever 6, has a pivotal connection with the yoke by a bolt 7, passing through the parts and is made vertically adjustable by the series of holes 4. The short end of this lever is provided with a vertical slot 8, and the long end is made in handle form. To the side of the long end of the lever is pivoted a bar 9, having its lower edge formed with saw teeth 10, which engage the pin 5.

When the felly of a wheel becomes loose upon the tire from shrinking it may be expanded and held in such position by separating it from the spokes and inserting a washer the required thickness between the shoulder of the spoke and the inside of the felly, and this is accomplished by placing the hollowed out lower end of the base upon the hub of the wheel, and adjusting the height of the lever to suit the length of the spoke. The short end of the lever is then placed around the spoke and against the under face of the felly, pressure is then applied to the handle end of the lever forcing the felly against the tire, and a washer is then placed around the tenon of the spoke between the shoulder of the spoke and the under face of the felly, to fill the space. Upon the downward pressure of the handle end of the lever the teeth of the bar will slip over the pin 5, until the pressure is somewhat released when the teeth will catch upon the pin and hold the lever from further movement, allowing the washer to be inserted.

It will be noticed that the toothed bar 9, is placed on the outside of the base which is essential in order that it may pass between the spokes.

I claim as my invention—

A device for forcing a felly of a wheel against the tire, consisting of a base having a hollowed out lower end, and a metallic yoke connected to its upper end having a series of holes, a lever having a pivotal connection with the yoke portion one end being vertically slotted and a saw toothed bar having a pivotal connection with the other end of the lever, the teeth engaging a pin extending from the side of the base.

JOHN TRIPP.

Witnesses:
A. O. BEHEL,
E. BEHEL.